July 22, 1941.   C. A. WOODS, JR   2,249,877

PHASE SHIFTING NETWORK

Filed July 31, 1940

WITNESSES:
N. F. Susser
Nw. C. Groome

INVENTOR
Charles A. Woods, Jr.
BY
Franklin E. Hardy
ATTORNEY

Patented July 22, 1941

2,249,877

UNITED STATES PATENT OFFICE 2,249,877

PHASE SHIFTING NETWORK

Charles A. Woods, Jr., Wilkinsburg, Pa., assignor to Westinghouse Electric & Manufacturing Company, East Pittsburgh, Pa., a corporation of Pennsylvania Application July 31, 1940, Serial No. 348,812

7 Claims. (Cl. 172—238)

This invention relates to a phase shifting network for adjusting the phase angle of the voltage applied to a burden or voltage responsive instrument with respect to the voltage of the source.

It is an object of the invention to provide a phase shifting network of the above indicated character employing parallel or series connections between a plurality of circuit elements such as resistors, capacitors and reactors requiring a minimum of mechanical interlocks to prevent undesired operation of the circuit controlling switches employed for varying the circuits, which undesired operation might result in short circuits or improperly connected parts of the network.

Figure 1:
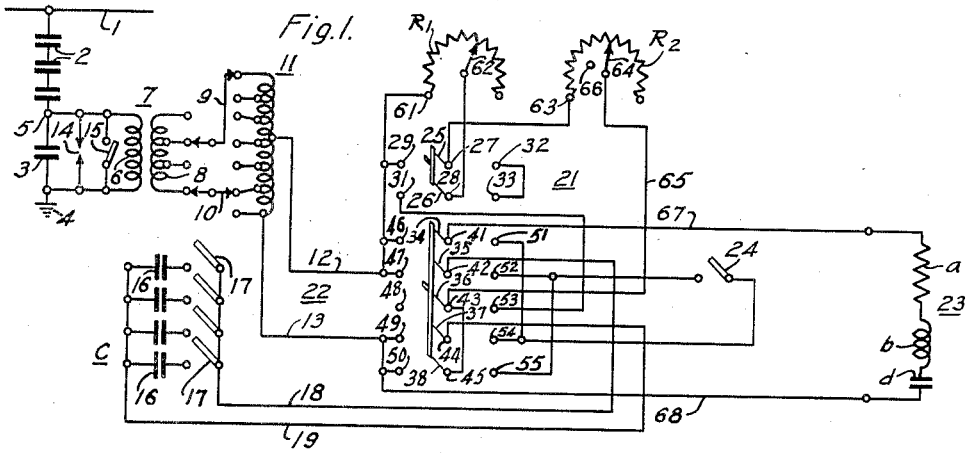

Other objects and advantages of the invention will appear from the following description of one preferred embodiment thereof, reference being had to the accompanying drawing, in which:

Figure 1 is a diagrammatic view of circuits and apparatus comprising one embodiment of the invention; and Figs. 2, 3, 4 and 5 are simplified diagrammatic views illustrating the circuit arrangements resulting from different positions of the switches shown in Fig. 1.

Referring to Fig. 1, the phase shifting network is shown applied to a capacitance potential device connected to an alternating current conductor 1 which may be one conductor of a three-phase alternating current circuit. The potential device comprises a plurality of condensers connected between the conductor 1 and ground at 4, including a section 2 and a section 3 between which a tap 5 is connected. The series connected capacitors constitute a coupling capacitor or capacitance potentiometer to which the primary winding 6 of a main transformer 7 is connected between the tap 5 and ground at 4. The tapped secondary winding 8 of the transformer 7 is connected through conductors 9 and 10 to a tapped auxiliary transformer 11 from which the conductors 12 and 13 extend and comprise the voltage source for supplying the phase shifting network. A protective gap 14 and a short circuiting switch 15 are provided across the high voltage winding 6 of the transformer 7.

The network includes a plurality of impedance devices, here illustrated as two rheostats R₁ and R₂, for introducing varying amounts of resistance into portions of the network circuit and a capacitor indicated generally at C and including a selected number of individual capacitors 16 which may be connected through their associated individual switches 17 between conductors 18 and 19. The network also includes a rheostat switch 21 having an open position and two circuit closing positions, a phase shifting switch 22 likewise having two circuit closing positions, the burden 23 which is illustrated as comprising a resistor $a$, reactor $b$ and capacitor $d$ connected in series, and which may be any voltage responsive instrument such as a meter, relay, or the like. In the illustrated phase shifting network the circuit arrangements are such as to introduce resistance and capacitance only into the network circuit, although it will be appreciated that reactors may be substituted for the resistors, or may be introduced in addition to the resistors by providing the additional circuit connections necessary.

The switch 21 comprises switch blades 25 and 26 connected to the switch poles 27 and 28, respectively, and adapted when the blades are thrown to their left or "parallel" position to connect the terminals 27 and 28 with terminals 29 and 31, respectively, and when the switch blades are thrown to their right or "series" position to connect the terminals 27 and 28 to the terminals 32 and 33, respectively. These two circuit closing positions of the switch 21 connect the resistors R₁ and R₂ in parallel circuit relation or in series circuit relation with each other in the network.

The switch 22 is illustrated as a five-pole double throw switch including switch blades 34, 35, 36, 37 and 38 connected to pole terminals 41, 42, 43, 44 and 45, respectively, a plurality of terminals 46, 47, 48, 49 and 50 and a second group of terminals 51, 52, 53, 54 and 55. The several switch blades 34 to 38, inclusive, are movable together as a unit to the one or the other of the two circuit closing positions of the switch, and when moved to the left or "parallel" position into engagement with the terminals 46 to 50, respectively, connect the adjusting rheostats, the adjusting capacitor, and the burden in parallel circuit relation with each other, and when moved to the right or "series" position to engage the switch terminals 51 to 55, respectively, connect the adjusting rheostats, the adjusting capacitor and the burden in series circuit relation with each other between the conductors 12 and 13.

Figures 2, 3:
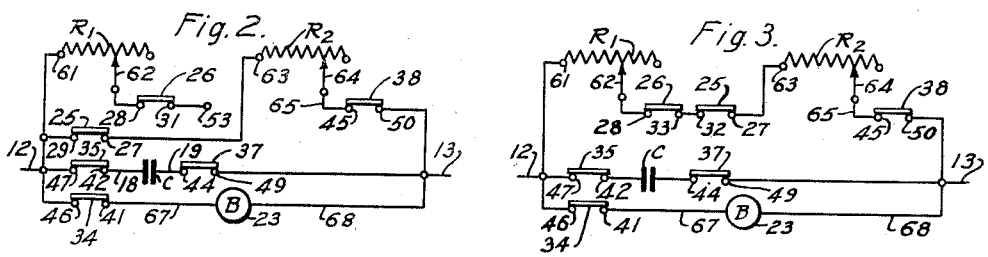

If the switches 21 and 22 are both in their left or "parallel" positions, the circuits resulting will be as illustrated in Fig. 2. It will be noted that the conductor 12 is directly connected to the terminal 61 of the rheostat R₁, the movable arm 62 of which is connected to the switch terminal 28 and through switch blade 26 to terminal 31 which is connected to the terminal 53 of the phase shifting switch 22 through which the circuit is not completed when switch 22 is in its "parallel" position. A circuit from conductor 12 to conductor 13 is, however, completed through rheostat $R_2$ which includes switch terminal 29, switch blade 25, switch terminal 27, rheostat terminal 63, rheostat arm 64, conductor 65 to the terminal 45 of switch 22 through switch blade 33 and switch terminal 50 to conductor 13. It will be noted that a stop 66 is provided for limiting the movement of the rheostat arm 64 in a counterclockwise direction to insure at all times that there is a minimum predetermined value of resistance in the above traced circuit to thus prevent a short circuit. A circuit through the capacitor C extends from conductor 12 through switch terminal 47, switch blade 35, terminal 42, conductor 18, capacitor C, conductor 19, switch terminal 44, switch blade 37 and terminal 49 to conductor 13. In the parallel position of the switch 22 a circuit likewise extends from conductor 12, through switch terminal 46, switch blade 34, terminal 41, conductor 67, to the burden 23 and by conductor 68 to the terminal conductor 13. It will be noted from the circuits just above traced that when both the switch 21 and the switch 22 are in their left or "parallel" positions, the rheostat $R_2$, the capacitor C and the burden 23 are connected in parallel circuit relation to each other between conductors 12 and 13. By movement of the switch 21 to its circuit interrupting position, the rheostat $R_2$ may be removed from the circuit leaving the adjusting capacitor C in parallel circuit relation to the burden 23. If the switch 21 is moved to its right or "series" position when the switch 22 is left in its "parallel" position, the circuits will be as illustrated in Fig. 3. The circuit of the rheostats extends from terminal conductor 12 to the terminal 61 of rheostat $R_1$, through the rheostat and from the rheostat arm 62 through switch terminal 28, switch blade 26, switch terminals 33 and 32, switch blade 25 to terminal 27, to rheostat terminal 63, rheostat arm 64, conductor 65, switch terminal 45 of the phase shifting switch 22, switch blade 38 and terminal 50 to conductor 13. The parallel circuits through the capacitor C and the burden 23 shown in Fig. 3 correspond to those shown and described above with respect to Fig. 2. In the circuit arrangement shown in Fig. 3 the stop 66 functions as previously described to maintain the desired minimum resistance.

Figure 4:
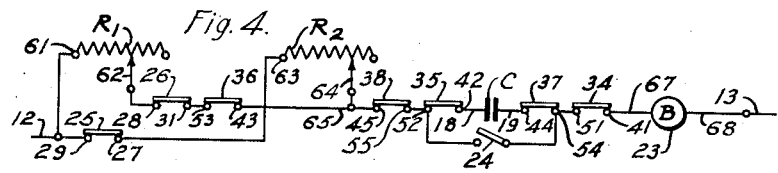

With the phase shifting switch 22 closed in its "series" position and the rheostat switch 21 closed in its "parallel" position, the circuit arrangement of the network is as shown in Fig. 4 in which a circuit extends from conductor 12 to the terminal 61 of rheostat $R_1$ through rheostat arm 62, switch terminal 28, contact blade 26 and terminal 31 of the rheostat switch to terminal 53, blade 36 and terminal 43 of the phase shifting switch to conductor 65, which conductor connects with terminal 45 of the phase shifting switch and arm 64 of rheostat $R_2$. A circuit also extends in parallel to the above traced portion of the network circuit from conductor 12 through switch terminal 29, switch blade 25, terminal 27 to the terminal 63 of rheostat $R_2$ to rheostat arm 64 and conductor 65. From conductor 65 the circuit is completed through switch terminal 45, switch blade 38, terminal 55 that is connected to switch terminal 52, through this terminal, blade 35, terminal 42, conductor 18, the capacitor C, conductor 19, switch terminal 44, switch blade 37 and terminal 54 of switch 22, through switch terminal 51, switch blade 34, terminal 41, conductor 67, burden 23 and conductor 68 to conductor 13 of the source. With this circuit arrangement it will be noted that the two rheostats $R_1$ and $R_2$ are connected in parallel relation to each other and in series with the capacitor C and the burden 23 between the source comprising conductors 12 and 13. The rheostat $R_1$ may be varied to short circuit the rheostats from the series circuit by bringing the contact arm 62 down to the terminal 61 and may be varied in the opposite direction to increase the resistance to the maximum value of the two rheostats $R_1$ and $R_2$ in parallel. The by-pass switch 24 is connected between the switch terminals 52 and 54 of the phase shifting switch 22 and in the position of the switch shown in Figs. 4 and 5 may be used to short circuit the capacitor C from the network.

Figure 5:
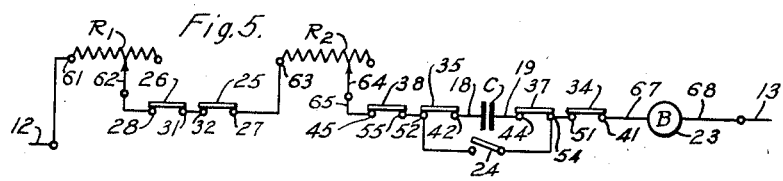

With the rheostat switch 21 and the phase shifting switch 22 both in their right-hand or "series" circuit closing positions, the circuits of the network will be as shown in Fig. 5, the rheostats $R_1$ and $R_2$ being connected in series circuit with each other between conductors 12 and 65 in exactly the same manner as for this portion of the circuit traced above in Fig. 3, the remainder of this series circuit from the conductor 65 to the conductor 13 corresponding to the circuit illustrated and described with respect to Fig. 4.

As above described, the purpose of the phase shifting network in its present application is to obtain a large angular shift in the secondary voltage applied to the burden 23 with respect to the voltage across the capacitor potentiometer between conductor 1 and ground and delivered from the potentiometer through the main and auxiliary transformers across conductors 12 and 13. It will be apparent that with the arrangement of the parts of the phase shifting network illustrated and described, the necessary circuits for effecting this result, together with the attendant regulation of the various elements of the circuits may be readily effected by the simple operation of two main switches and a by-pass switch and the variation of the several impedance devices included in the network.

Many modifications in the circuits and apparatus illustrated and described may occur to those skilled in the art within the spirit of my invention, and I do not wish to be limited otherwise than by the scope of the appended claims.

I claim as my invention:

1. In combination, an alternating voltage source of electrical energy, a burden supplied therefrom, and a phase shifting network for effecting an angular shift in the voltage applied to the burden with respect to the voltage of the source, comprising a reactance device, a plurality of impedance means, switching means operable for selectively connecting said impedance means in parallel circuit relation or in series circuit relation, and switching means operable in one position for connecting said impedance means, said reactance device, and said burden in parallel circuit relation to each other and operable in another position for connecting said impedance means, said reactance device and said burden in series circuit relation with each other.

2. In combination, an alternating voltage source of electrical energy, a burden supplied therefrom, and a phase shifting network, for effecting an angular shift in the voltage applied to the burden with respect to the voltage of the source, comprising a reactance device and a plurality of impedance devices, a switch associated with said impedance device having two operative circuit closing positions and a phase shifting switch having two operative circuit closing positions, the first named switch being operable in one of its circuit closing positions for connecting like terminals of said impedance devices together to effect parallel operation thereof and operative in its second circuit closing position for connecting unlike terminals thereof together to effect series operation thereof, said second named switch having a contact effective in one of the two circuit closing positions of the switch for completing the said parallel circuit and a contact effective in the other of the two circuit closing positions of the switch for connecting said impedance devices directly to the source.

3. In combination, an alternating voltage source of electric energy, a burden supplied therefrom, and a phase shifting network for effecting an angular shift in the voltage applied to the burden with respect to the voltage of the source comprising a reactance device and a pair of impedance devices, an impedance device switch having two circuit closing positions and a phase shifting switch having two circuit closing positions, the first named switch being operable in one of its circuit closing positions for connecting like terminals of said impedance devices together to effect parallel operation thereof and operable in its second circuit closing position for connecting unlike terminals thereof together to effect series operation thereof, said phase shifting switch having a contact effective in one of the two circuit closing positions of the switch for completing the parallel circuit and a contact effective in said first named position of the switch for completing the connection of the said terminal to said reactance device, and effective in the other of the two circuit closing positions of the switch for connecting a terminal of one of said impedance devices directly to the source.

4. In combination, an alternating voltage source of electrical energy, a burden supplied therefrom, and a phase shifting network for effecting an angular shift in the voltage applied to the burden with respect to the voltage of the source comprising a reactance device and an impedance means, a phase shifting switch having two circuit closing positions, said switch being operable in one circuit closing position for connecting said impedance means, said reactance device and said burden in parallel circuit relation to said source and operable in another circuit closing position for connecting said impedance means, said reactance device and said burden in series circuit relation to said source.

5. In combination, an alternating voltage source of electrical energy, a burden supplied therefrom, and a phase shifting network for effecting an angular shift in the voltage applied to the burden with respect to the voltage of the source comprising a reactance device and a pair of impedance devices, a switch associated with said impedance device having two circuit closing positions and a phase shifting switch having two circuit closing positions, the first named switch being operable in one of its circuit closing positions for connecting like terminals of said impedance devices together to effect parallel operation thereof and operable in its second circuit closing position for connecting unlike terminals thereof together to effect series operation thereof, said second named switch having a contact effective in one of its two circuit closing positions for completing the above-named parallel circuit and a contact effective in the other of the two circuit closing positions for completing the connection of said impedance devices to the source, and a by-pass switch operative when closed for shunting said reactance device from the circuit only when the second named switch is in its second recited circuit closing position.

6. In combination, an alternating voltage source of electrical energy, a burden supplied therefrom, and a phase shifting network for effecting an angular shift in the voltage applied to the burden with respect to the voltage of the source comprising a reactance device and a pair of impedance devices, a switch associated with said impedance device having two circuit closing positions and a phase shifting switch having two circuit closing positions, the first named switch being operable in one of its circuit closing positions for connecting like terminals of said impedance devices together to effect parallel operation thereof and operable in its second circuit closing position for connecting unlike terminals thereof together to effect series operation thereof, said second named switch having a contact effective in one of the two circuit closing positions of the switch for completing the parallel circuit and a contact effective in said first named position of the switch for connecting a terminal of one of said impedance devices directly to the source, and effective in the other of the two circuit closing positions of the switch for completing the connection of the said terminal to said reactance device, and a by-pass switch operative when closed for shunting said reactance device from the circuit only when the second named switch is in its second recited circuit closing position.

7. In combination, an alternating voltage source of electrical energy, a burden supplied therefrom, and a phase shifting network for effecting an angular shift in the voltage applied to the burden with respect to the voltage of the source comprising a reactance device and an impedance means, a phase shifting switch having two circuit closing positions, said switch being operable in one circuit closing position for connecting said impedance means, said reactance device and said burden in parallel circuit relation to said source and operable in another circuit closing position for connecting said impedance means, said reactance device and said burden in series circuit relation to said source, and a by-pass switch operative when closed for shunting said reactive inductance from the circuit only when the phase shifting switch is in its second recited circuit closing position.

CHARLES A. WOODS, Jr.